United States Patent Office 3,077,873
Patented Feb. 19, 1963

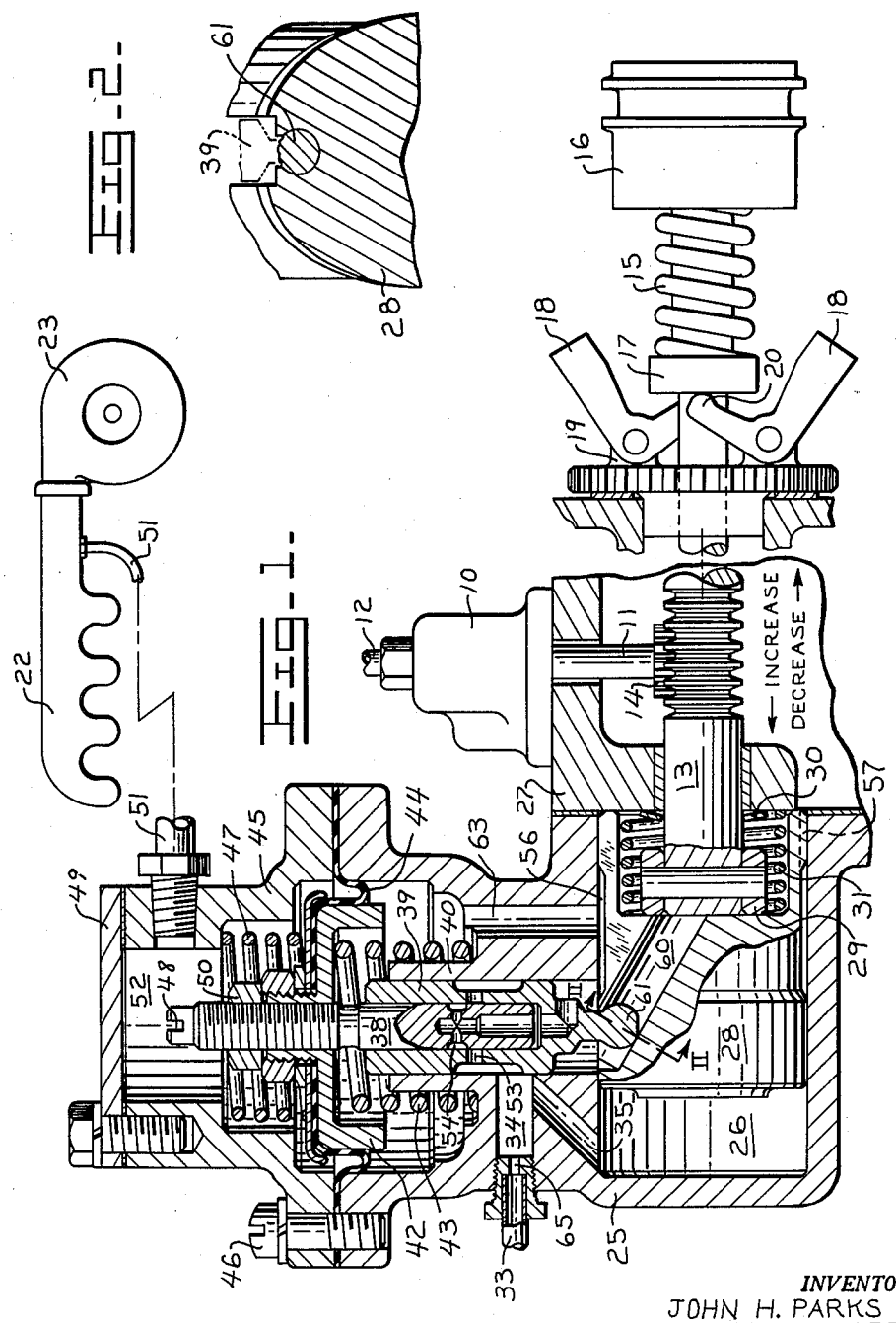

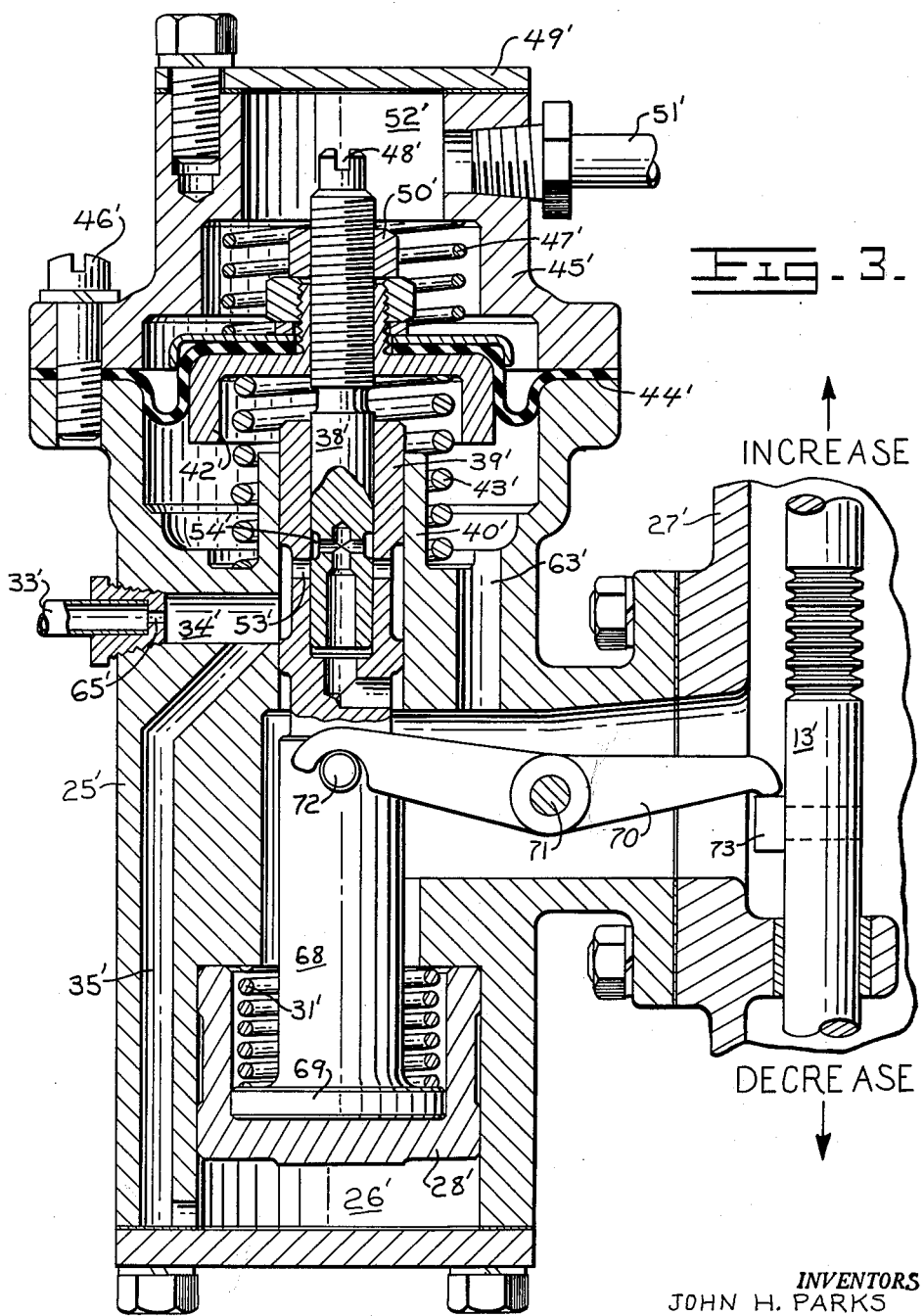

3,077,873
PRESSURE ACTUATED FUEL CONTROL FOR SUPERCHARGED ENGINES
John H. Parks and Robert H. Miller, Peoria, and Roy T. Paluska, Washington, Ill., assignors to Caterpillar Tractor Co., Peoria, Ill., a corporation of California
Filed Aug. 4, 1961, Ser. No. 129,399
3 Claims. (Cl. 123—140)

This invention relates to automatic control of fuel to supercharge the engines to prevent incomplete fuel combustion and consequent smoking which results during certain conditions of engine operation as described in our assignee's United States Letters Patent to John H. Parks, No. 2,767,700 entitled "Fuel Control for Supercharged Engine."

As set forth in said patent, rapid acceleration of many types of supercharged engines results in heavy and objectionable exhaust smoke. This is particularly prevalent during acceleration of engines provided with exhaust driven superchargers wherein the manual governor control may be advanced more rapidly than the engine and supercharge build up speed to provide sufficient air to the combustion spaces of the engine to support complete burning of the fuel injected during a given cycle. This results in excessive quantities of unburned fuel being expelled from the engine in the form of exhaust smoke.

Furthermore engines with superchargers of the exhaust driven type inherently smoke under lug, which is defined as the condition when resistance to movement of the engine or engine load increases until engine speed is decreased from that indicated by the governor setting. Under lug conditions, the engine governor attempts to regain the engine speed indicated by the governor setting by automatically advancing the engine fuel rack to supply more fuel but due to the reduction in supercharger speed resulting from reduced engine speed, insufficient air is supplied to the engine to support complete combustion of the additional fuel being injected. It is desirable, therefore, to provide a device operating in the manner of the device disclosed in the above identified Parks patent which is responsive to inlet manifold pressure to override the governor and limit the amount of fuel injected into the combustion space under high fuel demand, low speed operating conditions and permit only that amount of fuel to be injected into the combustion space of the engine which can be efficiently burned therein and thus substantially reduce exhaust smoke under these conditions.

It is the object of the present invention to provide a device responsive to inlet manifold pressure for controlling the quantity of fuel directed to the combustion space of an engine in which a minimum of mechanical linkage is employed so that the accuracy and responsiveness of the device is not materially affected by wear and to provide such a device in which the force which acts in opposition to the governor setting is provided by hydraulic fluid under pressure and, therefore, greater and more positive in its action than the air pressure in the intake manifold of the engine.

Further and more specific objects and advantages of the invention and the manner in which the invention is carried into practice are made apparent in the following specification wherein reference is made to the accompanying drawings.

In the drawings:
FIG. 1 is a central vertical section through a control mechanism embodying the present invention schematically illustrating a supercharged intake manifold and a governor control mechanism associated therewith;

FIG. 2 is a fragmentary sectional view taken on the line II—II of FIG. 1; and
FIG. 3 is a view like FIG. 1 of a modified form of the invention.

A conventional fuel feed mechanism for a compression ignition engine is symbolized in the drawing as comprising a fuel pump 10 of the metering type in which a plunger 11 is reciprocable during engine operation to supply fuel through a conduit 12 to one of the cylinders of the engine, there being one such pump 10 for each engine cylinder. The pump is of the well known metering type in which angular adjustment of the plunger 11 results in variation of the quantity of fuel injected upon each stroke. Angular adjustment and variation of fuel quantity is accomplished by longitudinal movement of a rack bar partially shown at 13 which has teeth meshing with a gear 14 fixed to the pump plunger. A main governor spring 15 is tensioned by an adjustable spring seat 16 to apply force to a collar 17 fixed to the rack bar 13 to urge the bar toward the left as shown in the drawing for increasing fuel feed. Action of the spring 15 is resisted by a pair of flyweights 18 pivotally carried on a yoke 19 which is rotated through gearing (not shown) at a speed comparable to engine speed so that upon outward movement of the flyweights due to centrifugal action fingers 20 thereon engage the collar 17 to oppose the action of the governor spring or tend to decrease the rate of fuel feed to the engine. FIG. 1 also shows an intake manifold 22 to which air is supplied by an exhaust driven supercharger blower 23.

The present invention provides means in addition to the governor flyweight and governor spring for controlling the position of the rack bar 13 in response to pressure conditions in the intake manifold 22 in order that fuel delivered to the combustion spaces of the engine will not be in excess of the capacity of the intake manifold to supply air for complete combustion thereof. To accomplish this, a housing 25 with a cylinder 26 therein is secured to the fuel pump housing 27 adjacent the end of the rack bar 13 which extends therethrough and a piston 28 reciprocably mounted in the cylinder 26 engages the end of the rack bar adjacent a stop collar 29 thereon which limits the movement of the rack bar toward the right upon engagement with a spring washer 30. A spring 31 interposed between the fuel pump housing and the end of a spring cavity in the piston 28 urges the piston toward the left against the pressure of oil in the cylinder 26 at the head end of the piston. The spring 31 also serves to move the piston 28 toward the left when the engine is shut down and oil pressure in the cylinder fails so that the piston will not interfere with the desired governor setting for restarting the engine. Oil pressure in the cylinder 26 is supplied by an engine driven pump, not shown, which may be the lubricating oil pump, and oil enters the cylinder through a line 33 and passages 34 and 35. The value of the pressure in the cylinder 26 is determined by pressure in the intake manifold 22 and the position of the rack bar which combine to control valve means effective to bleed off a portion of the oil which enters through the line 33 to create pressure in the cylinder. This valve means comprises a spool 38 which is reciprocably disposed in a valve housing 39 which is also reciprocably mounted in a cylinder 40 formed as a part of the housing 25. The valve spool 38 is threaded through a cup 42 which serves as a seat for a spring 43 and as a support for the central portion of a diaphragm 44 secured between the housing 25 and a cover 45 thereof as by cap screws 46. A spring 47 in the cover 45 opposes the action of the spring 43 establishing a condition of normal preloaded balance for the spring 43 so that it is extremely sensitive to variations in pressure on the diaphragm 44. The valve spool is adjustable through its threaded connection and a screw driver slot 48 in its upper end which is accessible through a cover plate 49 and it is held in its position of adjustment by a lock nut 50.

Under normal conditions of engine operation with a given pressure in the intake manifold 22, this pressure is communicated, as through a line 51, to a chamber 52 of the diaphragm and exerts a downward force on the diaphragm and valve spool 38. This tends to open communication between ports 53 in the valve body 39 and an annular groove 54 in the valve through which oil under pressure bleeds downwardly to an annular recess 56, in the piston 28 and then outwardly through a drain slot 57 which communicates with the fuel pump housing and eventually with the engine lubricating oil sump. This effects reduction of oil pressure in the cylinder 26 permitting the piston 28 to move toward the left under influence of the governor spring augmented by the force of the spring 31. Such leftward movement of the piston 28 is accompanied by downward movement of the valve body 39 because the piston and valve body are connected by an inclined cylindrical slot or cam groove 60 in the piston which receives a ball-like terminal end 61 on the valve body in the manner shown in FIG. 2. This downward movement of the valve body tends to close communication between the ports 53 and the annulus 54 until a balance is reached to establish a fuel feed setting commensurate with the pressure of air to the intake manifold.

When any condition of operation exists such as when the engine is under lug or the main governor spring is reset to increase fuel feed, movement of the piston 28 toward the left to increase fuel feed draws the valve body 39 downwardly completely interrupting communication between ports 53 and annulus 54. This increases oil pressure in the cylinder 26 to limit increased fuel feed until engine speed is recovered and manifold pressure increases to the point where valve spool 38 is urged downwardly again to relieve oil pressure and permit continued operation of the engine under balanced fuel and air conditions.

Any oil leaking into the space below the diaphragm 44 is relieved through a passage 63 from which it drains to the annular recess 56 and the piston 28 and to the engine sump as previously described. Oil under pressure from the lubricating oil system enters the passages leading to the cylinder 26 through an orifice 65 which is smaller than the ports 53 and other passages through which the oil pressure is reduced so that upon opening of the bleedoff passages the spring pressure which tends to retract the piston 28 is effective to expel oil from the cylinder 26 above the head of the piston so that a condition of balance is quickly obtained.

A modified form of the invention is shown in FIG. 3 wherein it has been accommodated to an engine upon which space does not permit the mounting of the housing 25 on the fuel pump housing in direct alignment with the rack bar. In FIG. 3, those parts of the structure which are identical in construction or function with those of FIG. 1 are marked with the same reference character primed and the rack bar shown at 13' is seen as parallel to the valve spool 38' and slidable valve body 39'. A cylinder 26' is disposed in axial alignment with the control valve and the slidable valve body is provided with an extension 68 with a flanged end 69 thereon for receiving one end of a spring 31', the function of which is identical with that of the spring 31 in FIG. 1. In this modification, connection between the rack bar and the valve body which is obtained through the groove 60 and ball 61 of FIG. 1 is obtained by a lever 70 and having a hooked end engageable with a pin 72 on the extended portion of the valve body and its opposite end engageable with a projection 73 on the rack bar which projection may be provided, as shown, by a stud having a threaded connection with the rack bar.

The function of the device illustrated in FIG. 3 is believed apparent from the foregoing description of FIG. 1 with the exception that upon movement of the rack bar to increase fuel, the lever 70 serves to move the valve body downwardly for closing communication between ports 53' and discharge passage 54'. Similarly high pressure in the cylinder 26' tends to move the piston 28' upwardly and the rack bar toward a decreased fuel feed position through the lever 70'.

In the construction herein illustrated and described there is a minimum of moving parts in which excessive wear tends to prevent rapid response to variation of pressure conditions and the high pressure of oil in the engine lubricating system is more effective in opposing the action of a governor spring especially in large engines than the slight variations of pressure of air in the intake manifold which in the present construction is not relied upon to oppose the action of the governor spring.

We claim:

1. In an internal combustion engine having a governor, a movable member associated with the governor to control fuel supply, and an engine driven supercharger for supplying air to the engine intake manifold, means responsive to intake manifold pressure for overriding the governor and limiting movement of said movable member under high fuel demand, low speed conditions comprising fluid pressure actuated means biasing said movable member in a low fuel supply direction, a valve for bleeding fluid from said biasing means, means operable to impart closing movement to said valve when manifold pressure is low, and means operable to impart opening movement to said valve upon movement of said movable member to increase fuel supply, said valve comprising two slidable parts with fluid passages opened and closed by relative sliding movement, one of said parts being actuated by intake manifold pressure and the other by movement of said fuel control member.

2. The combination of claim 1 in which one slidable valve part is connected with a flexible diaphragm forming one wall of a chamber, and a passage communicating between said chamber and the intake manifold.

3. The combination of claim 2 in which the diaphragm is normally positioned by two springs acting in opposition to each other.

References Cited in the file of this patent

UNITED STATES PATENTS 2,589,788    Fell _____ Mar. 18, 1950

FOREIGN PATENTS 783,322    Great Britain _____ Sept. 18, 1957